United States Patent
Moss

(10) Patent No.: US 10,305,614 B2
(45) Date of Patent: May 28, 2019

(54) BROADCAST NETWORK

(71) Applicant: British Broadcasting Corporation, London (GB)

(72) Inventor: Peter Moss, London (GB)

(73) Assignee: British Broadcasting Corporation, London (GB)

( * ) Notice: Subject to any disclaimer, the term of this patent is extended or adjusted under 35 U.S.C. 154(b) by 0 days.

(21) Appl. No.: 15/574,932

(22) PCT Filed: May 18, 2016

(86) PCT No.: PCT/GB2016/051432
§ 371 (c)(1),
(2) Date: Nov. 17, 2017

(87) PCT Pub. No.: WO2016/185206
PCT Pub. Date: Nov. 24, 2016

(65) Prior Publication Data
US 2018/0167152 A1      Jun. 14, 2018

(30) Foreign Application Priority Data
May 19, 2015   (GB) .................................. 1508557.4

(51) Int. Cl.
*H04H 20/67*    (2008.01)
*H04H 20/42*    (2008.01)
(Continued)

(52) U.S. Cl.
CPC .......... *H04H 20/67* (2013.01); *H04B 7/0413* (2013.01); *H04H 20/423* (2013.01);
(Continued)

(58) Field of Classification Search
CPC ...... H04H 20/67; H04H 20/42; H04H 20/423; H04H 20/426; H04H 20/53; H04H 20/57;
(Continued)

(56) References Cited

U.S. PATENT DOCUMENTS 6,011,786 A * 1/2000 Dent .................... H04B 7/2643
370/330
8,965,294 B2 * 2/2015 Seo ........................ H04J 11/005
455/437

(Continued)

FOREIGN PATENT DOCUMENTS

EP          2182663      5/2010
WO    WO 2006/135710    12/2006

OTHER PUBLICATIONS

EP 2182663 A1 by Yang Song, published on May 5, 2010.*
(Continued)

*Primary Examiner* — Siu M Lee
(74) *Attorney, Agent, or Firm* — Daly, Crowley, Mofford & Durkee, LLP

(57) ABSTRACT

A method of operating a wireless network operating on a single frequency across a geographical area involves dividing the network into regions and arranging that the transmission of signals in subsets of adjacent regions on the same frequency is such that a receiver does not receive signals from more regions than can be separated using demapping techniques. The transmission method evolves a pattern of time slots such that the number of adjacent regions of a subset of regions transmitting simultaneously on a single frequency is less than the number of signals that each receiver is capable of demapping. The demapping arrangements may include MIMO techniques, constellation schemes, QAM.

31 Claims, 4 Drawing Sheets

(51) Int. Cl.
*H04L 5/22* (2006.01)
*H04B 7/0413* (2017.01)
*H04L 27/34* (2006.01)

(52) U.S. Cl.
CPC ............ *H04H 20/426* (2013.01); *H04L 5/22* (2013.01); *H04L 27/34* (2013.01)

(58) Field of Classification Search
CPC ...... H04H 20/65; H04H 20/71; H04B 7/0413; H04L 5/22; H04L 27/34
USPC ....... 375/259, 260, 295, 296, 299, 316, 346, 375/347
See application file for complete search history.

(56) References Cited

U.S. PATENT DOCUMENTS

| | | | |
|---|---|---|---|
| 2008/0125131 A1 | 5/2008 | Guo | |
| 2016/0087702 A1* | 3/2016 | Koo | ................. H04B 7/0452 370/311 |
| 2016/0095157 A1* | 3/2016 | Wenzel | ................ H04L 69/325 370/329 |

OTHER PUBLICATIONS

Great Britain Search Report dated Dec. 2, 2015 for GB Application No. 1508557.4; 4 Pages.
International Search Report and Written Opinion dated Aug. 19, 2016; for PCT/GB2016/051432; 9 pages.

\* cited by examiner

BROADCAST NETWORK

CROSS REFERENCE TO RELATED APPLICATIONS

This application is a U.S. National Stage of PCT application PCT/GB2016/051432 filed: in the English language on May 18, 2016, and entitled "Broadcast Network," which claims priority to United Kingdom application GB1508557.4 filed May 19, 2015 which application is incorporated herein by reference.

BACKGROUND OF THE INVENTION

This invention relates to broadcast networks, in particular to such networks having multiple antennas that are geographically spread over an area with each antenna serving a region of the area.

Conventional broadcast network planning aims to ensure that for the majority of time, network self-interference is sufficiently controlled to allow reliable reception of the user's target transmissions without undue interference from more distant transmitters radiating different signals on the same frequency, or indeed the same content but outside the interference-free temporal limits of the underlying modulation system.

This can be achieved by the use of multiple frequencies, with signals which are inherently non-interfering. FIG. 1a shows one receiver 14 in a broadcast system receiving signals from two or more transmitters 10, 11 over a broadcast channel 12. FIG. 2 shows an example in which the transmitters use multiple frequencies for interference reduction where within a hexagon network of regions three frequencies are used to ensure no adjacent regions create co-channel interference. The three frequencies are shown with differing shading. As can be seen, each region is bordered by other regions operating at different frequencies. The example of FIG. 2 shows perfectly hexagonal regions, but in reality the coverage of each antenna will vary with geography of a landscape and so this should be considered a schematic representation of a real network.

This can be deemed an n=3 network since three frequencies are needed for full coverage of the area. Generally an n=M network has increasing spectral efficiency as M is made smaller, all other parameters being equal.

SUMMARY OF THE INVENTION

We have appreciated that broadcast networks using different frequencies for adjacent regions are an inefficient use of the available spectrum.

In broad terms the invention provides improved spectral efficiency in a broadcast network by a combination of techniques including interferer mitigation using channel estimation techniques combined with time slot assignment.

In an embodiment, the transmissions from antennas of adjacent regions of a network are arranged such that, in a given time slot, adjacent regions using the same frequency in the same time slot are such that a receiver receives no more signals from the transmitters than the number of signals that may be de-mapped using a de-mapping scheme. Preferably, the de-mapping scheme is a constellation scheme such as QAM or variants thereof. The combination of time slots and regional arrangement are thus such that the number of potential interferers is less than the number of signals de-mapped by the scheme at the receiver.

Preferably, the network is arranged such that the data content transmitted in each region is independent. This independence allows differing signals, for example differing television channel content, to be broadcast on neighbouring regions on the same frequency. Whilst the content is independent, the transmission arrangement may be coordinated between antennas, such as using predetermined pilots as part of the transmissions, so that the channel between transmitters and receivers may be estimated at the receivers.

BRIEF DESCRIPTION OF THE DRAWINGS

An embodiment of the invention will be described in more detail by way of example with reference to the accompanying drawings, in which.

DETAILED DESCRIPTION OF A PREFERRED EMBODIMENT OF THE INVENTION

The invention may be embodied in a method of broadcasting and receiving data, a transmitter, receiver and system comprising transmitter and multiple receivers such as in an audio-video broadcast network and an encoder or decoder. In this regard, a receiver includes a television, set top box or other device that includes capability to receive broadcast television channels.

Figure 1A:
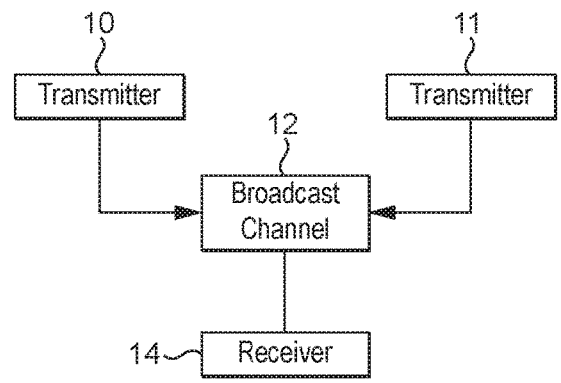
FIG. 1a is a schematic diagram of a system that may embody the invention.

FIG. 1a shows a system which may embody the invention and which schematically shows the reception at a receiver 14 of signals from two transmitters 10, 11 via a broadcast channel 12. The transmitters may be of adjacent regions such that the signals potentially interfere at the receiver. In a system having notionally hexagonal regions, signals from three such transmitters may be received at a given receiver potentially interfering with one another. In general, the greater the number of regions that meet at a given point or node, the greater the number of potential interferers. In a system having a uniform arrangement of regions, such as hexagonal arrangement shown, the regions may also be referred to as cells. However, the regions need not be restricted to any particular shape. A notable example is the countrywide spread of transmitters that cover a county with each transmitter serving an irregular geographic region.

The embodiment of the invention leverages the fact that any technique which allows mitigation of co-channel interference has the potential of allowing improvement to the basic n=3 re-use pattern described above.

The embodiment uses a technique, which may be described as interference mitigation by multiple signal demapping, that involves accepting the presence of two or more signals on a receive antenna at the same time, and attempting to separate them. This separation can be accomplished by making use of a decoder type normally used for MIMO signals where multiple receive antennas would be present.

Figure 1B:
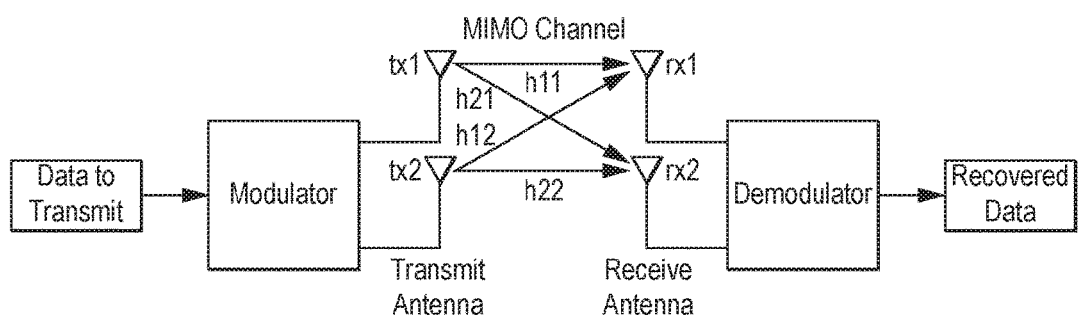
FIG. 1b is a schematic diagram of a MIMO arrangement of the type that may be adapted for use in an embodiment of the invention.

FIG. 1b schematically shows a MIMO arrangement conventionally used to transmit data from a source to a receiver, here using two transmit antennas and two receive antennas. The embodiment makes use of such an arrangement, but may have a single receive antenna. Some further explanation of the nature of the preferred de-mapping arrangement will now be given prior to describing a particularly advantageous arrangement. The technique used is similar to OFDM-MIMO de-mapping.

A transmission scheme that uses a constellation transmission arrangement and de-mapper may operate by representing a transmitted symbol (a number of bits) as a complex number and modulating a cosine and sine carrier signal with the real and imaginary parts (respectively). Thus a symbol can be sent on one frequency. As the symbols are represented as complex numbers, they can be visualized as points on the complex plane. The real and imaginary axes are often called the in phase, or I-axis and the quadrature, or Q-axis. Plotting several symbols in a scatter diagram produces the constellation diagram. The points on a constellation diagram are called constellation points, each point representing a symbol. The number of bits conveyed by a symbol depends upon the nature of the QAM scheme. The number of points in the constellation grid is a power of 2 and this defines how many bits may be represented by each symbol. For example, 16-QAM has 16 points, this being $2^4$ giving 4 bits per symbol. 64-QAM has 64 points, this being $2^6$ giving 6 bits per symbol. 256-QAM has 256 point, this being $2^8$ giving 8 bits per symbol. The use of 'QAM' is only one example, and the embodiment may equally use other constellation based transmission systems.

Upon reception of the signal, a demodulator examines the signal at points in time, determines the vector represented by the signal and attempts to select the point on the constellation diagram which is closest (in a Euclidean distance sense) to that of the received vector. Thus it will demodulate incorrectly if the corruption has caused the received vector to move closer to another constellation point than the one transmitted. The process of determining the likely bit sequences represented by the QAM signal may be referred to as demodulation, decoding or demapping.

Two schemes are known for decoding a QAM signal: hard decision decoding and soft decision decoding. In hard decision decoding, the decoder determines the closest constellation point to the received vector and this is deemed to be the symbol that was transmitted. The corresponding bit sequence is thereby determined. In soft decision decoding, the probability (or log-likelihood ratio, LLR) of each individual bit represented by a received vector is determined and provided as an output. The probabilities may then be used in subsequent processing, such as in a Viterbi decoder.

In a transmission scheme using both MIMO and QAM, multiple QAM symbols will be sent at any one time. For example, a 2×2 MIMO arrangement transmitting 16-QAM will transmit 2 symbols at any one time giving $16^2=256$ possible combinations. The possible combinations may be referred to as a search space. More generally, the number of combinations in a search space is $M^N$ where M is the QAM value and N the number of MIMO transmit antennas.

A MIMO system may be described by the equation $$y=Hx+n$$

where y is the received signal vector, H is the matrix channel, x is the transmitted vector and n is an added noise term.

The received vector y ($y_1$ and $y_2$) can be written in matrix form $$\begin{bmatrix} y_1 \\ y_2 \end{bmatrix} = \begin{bmatrix} h_{11} & h_{12} \\ h_{21} & h_{22} \end{bmatrix} \begin{bmatrix} x_1 \\ x_2 \end{bmatrix} + \begin{bmatrix} n_1 \\ n_2 \end{bmatrix}, \qquad (2)$$

where $x_1$ and $x_2$ are the transmitted symbols from transmitter 1 and transmitter 2 respectively, while $n_1$ and $n_2$ are the noise added to receiver 1 and receiver 2 respectively.

Several possible approaches are known for MIMO decoding, such as an exhaustive search, sphere decoding, etc. Sphere decoding is a reduced complexity simplification of the exhaustive search approach.

An approach employed in the receiver (an exhaustive search) may be to evaluate for each possible vector of transmit constellation points s the following norm $$d=\|y-\hat{H}s\|$$

where $\hat{H}$ is an estimate of the channel obtained by the receiver. Once the set of all possible values of d is determined further calculation allows the bit weights (LLRs) to be determined for use in a conventional forward error corrector (FEC).

Of course by so evaluating all the elements of s, the MIMO receiver has in effect eliminated their mutual interference as they have all been separated. Even if the system has only one receive antenna, as in the embodiment described here, but multiple transmit antennas (we shall be considering 2 and 3 as values of the latter here, although there is not a limit in principle), we can still use the above expression, albeit the channel H will degenerate to a row vector, which may now be written $$\begin{bmatrix} y_1 \\ \phantom{y_2} \end{bmatrix} = \begin{bmatrix} h_{11} & h_{12} \end{bmatrix} \begin{bmatrix} x_1 \\ x_2 \end{bmatrix} + \begin{bmatrix} n_1 \\ \phantom{n_2} \end{bmatrix}$$

Hence interferer(s) can be separated, as long as the signal-to-noise ratio is high enough and the projection of the constellation points onto a single antenna does not result in too low a theoretical capacity (tad' combinations). As long as the average capacity is enough, over an OFDM ensemble for instance, particular 'bad' combinations may be combatted with some form of delay coding (frequency/phase law, or even frequency/phase/magnitude law) at the transmitter. A determining factor on how many signals can be de-mapped (e.g. 1 or 2 in this example) is strongly linked to this signal-to-noise ratio (as well as the choice of constellation size—the bigger this is, the more SNR is required).

The embodiment makes use of the above described MIMO techniques but with the two differences in what may otherwise be a conventional COFDM system. First, the embodiment provides a signalling means to enable the channel from one or two additional interfering sources to be known, as well as the wanted signal. Second, the use of a MIMO de-mapper which has a dimensionality 1+no_of_interferers that may be present in a given time slot.

The signalling to allow channel estimation in an embodiment will now be described. In conventional MIMO systems, the purpose of multiple transmitters is typically to increase the data rate from a single source. However, the present embodiment instead applies the technique by using different geographically located antennas broadcasting different data content, but providing the ability for a receiver to discriminate between these signals using a demapper. The way in which this is achieved is by providing pilots within the signal from each antenna in such a manner that pilots are coordinated between antennas. One such coordination may be for the transmissions from the antennas to be synchronised and for each antenna to use specific pilots. Another way of achieving coordination is for each antenna to use a distinctive pilot set. In general, the number of sets of pilots within the system is the same as the number of signals that need to be demapped at a receiver.

The synchronisation of signals between antennas may be achieved by a variety of techniques, one simple way being to use an accurate clock from a common source such as from a GPS signal. The signals transmitted at each antenna may thereby be synchronised with others so that, for the example of OFDM signals, frames or symbols of the OFDM signals may be synchronised between antennas.

The signalling may be further understood by considering a specific example. In a television broadcast system such as using the DVB range of standards, each antenna serves a geographic region. The programme content of signals may differ between regions and so, on a single frequency, the data will differ between regions. However, a given receiver may be near equal distance from two or more such transmitters and so will receive two or more different signals. The signals may be demapped to separate them to provide the wanted signal and removing the unwanted signal(s). The demapping is achieved using known pilots within each transmitted signal as a mechanism to estimate the channel from each transmitter. The pilots from each transmitter need to be distinct so that all of the elements of the channel matrix can be estimated. Once the channel is estimated, this is used within a demapping process as described above. The system thereby allows transmitters of adjacent regions to provide different content whilst allowing discrimination of those signals at a receiver that is receiving more than one such signal. Any such scheme in which a channel estimate may be derived at a receiver from known transmitted symbols such as pilots may be used.

The demapping may use any scheme that provides discrete values in the form of a constellation scheme. This may be QAM or variants such as non-uniform QAM or condensed QAM (as described for example in our co-pending patent application GB 1202075.6).

In practice, if the ratio of the weaker of, say, two signals to the received noise n is enough to demodulate it, there is the possibility (subject to our not having a 'bad' combination in the above-mentioned sense) that both the stronger and the weaker can be obtained and the interference mitigation is complete. If two interferers are present, the weakest must again be at approximately the level which would allow independent de-mapping. The key parameter in establishing in which regime we find ourselves in a practical network is the field strength of the various transmissions.

We have devised some assumptions for a high field strength network which are tabulated below for a dense network in which we assume use of a modulation scheme with 7.6 MHz bandwidth, e.g. DVB-T2. We see that at a field strength of 60 dBµV/m (of the strongest signal), we have a signal-to-noise ratio of 37 dB, for that signal. Simulations show that this is enough to generally de-map two interferers as well as the wanted signal.

If the field strength had been in the region 50 dBµV/m, more typical of an outlying area in a broadcast network, then simulation shows that only one interferer could be separated.

| | | |
|---|---|---|
| Wanted signal field strength | 60 dBµV/m | |
| Centre frequency | 500 MHz | $\lambda = 0.6$ |
| Antenna gain G | 13 dB | |
| Antenna aperture | $G\lambda^2/4\pi$ | 0.573 m$^2$ |
| Impedance of free space | 377 Ω | |
| Received wanted signal power | 1.52 nW/−58 dBm | |
| Thermal noise in 7.6 MHz | −105 dBm | |
| Noise figure & implementation margin | 10 dB | |
| Receiver net snr | 37 dB | |

Figure 2:
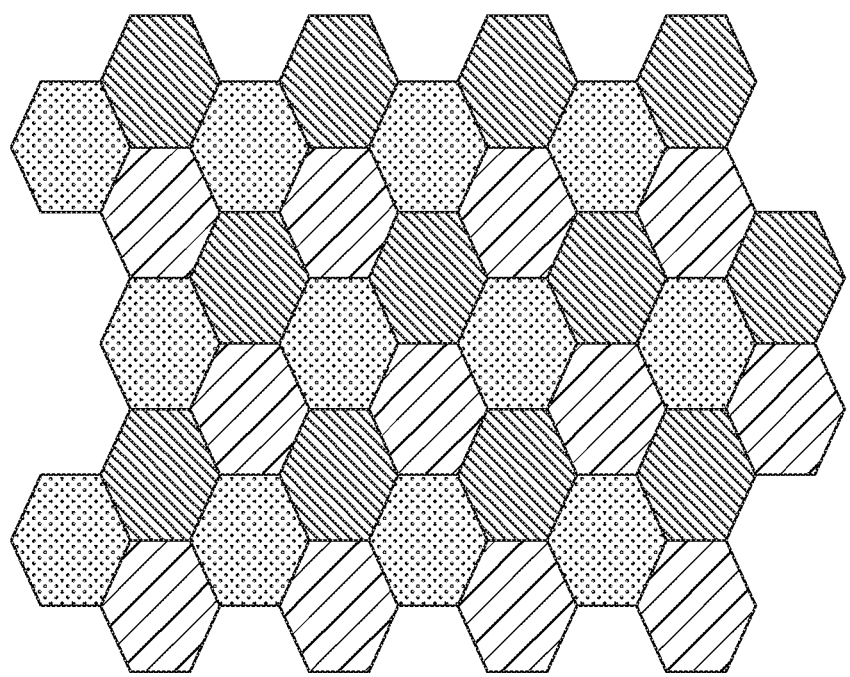
FIG. 2 is a diagram showing hexagonal regions using three different frequencies.
Figure 3:
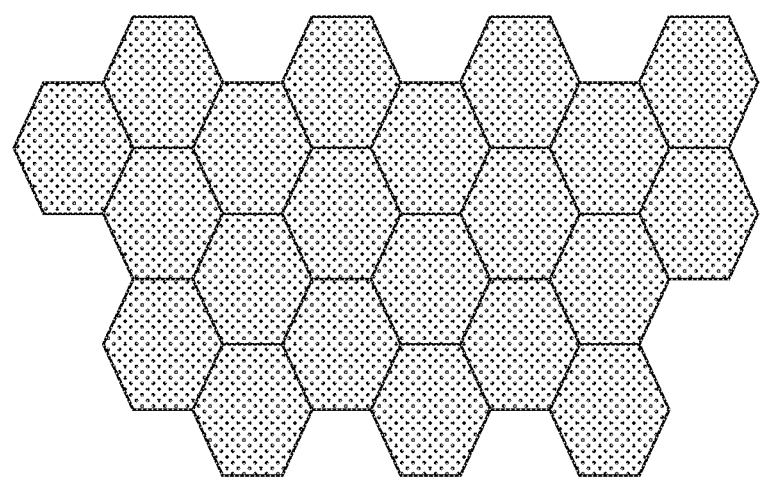
FIG. 3 is a diagram showing hexagonal regions using a single frequency (but potentially with different data transmitted in each region)

It we consider the higher signal strength value of 60 dBµV/m, we can assume cancellation of two signals and the previous n=3 network of FIG. 2 can actually be replaced with an n=1 network, if we assume interference occurs only at nodes and edges of the graph, that is we have the network design shown in FIG. 3. At a node, in this n=1 network, we have three regions coming together and hence two interferers. At an edge, we have two regions coming together and hence a single interferer has to be dealt with.

However, if we consider the lower signal strength value of 50 dBµV/m, we can only assume the cancellation of one signal. In this situation conventionally at least two frequencies would be needed (n=2), where we have retained co-channel edges but not nodes.

The embodiment appreciates a generalised feature of multiple signal de-mapping arrangements in that the more interferers at a given node or edge of a region that can be separated, the less need for use of different frequencies in adjacent regions. Furthermore, the embodiment appreciates that single frequency arrangements are desirable for backward compatibility. Preferably, the network is arranged such that the data transmitted in each region is independent (although pilots may be synchronised as discussed).

The second feature, namely the use of a MIMO de-mapper that has a dimensionality 1+no_of_interferers that may be present in a given time slot will now be discussed in more detail. The advantage provided by the use of time slots may be understood by contrasting to prior arrangements which have attempted to avoid all interference by using different frequencies for adjacent regions. The present embodiment departs from this approach and intentionally allows adjacent regions to operate on the same frequency, but provides demapping at the receiver. To avoid providing more signals than can be demapped, the signals from adjacent regions are broadcast using a time slot assignment such that a receiver will not receive more independent signals than can be demapped in any given time slot.

Figure 4:
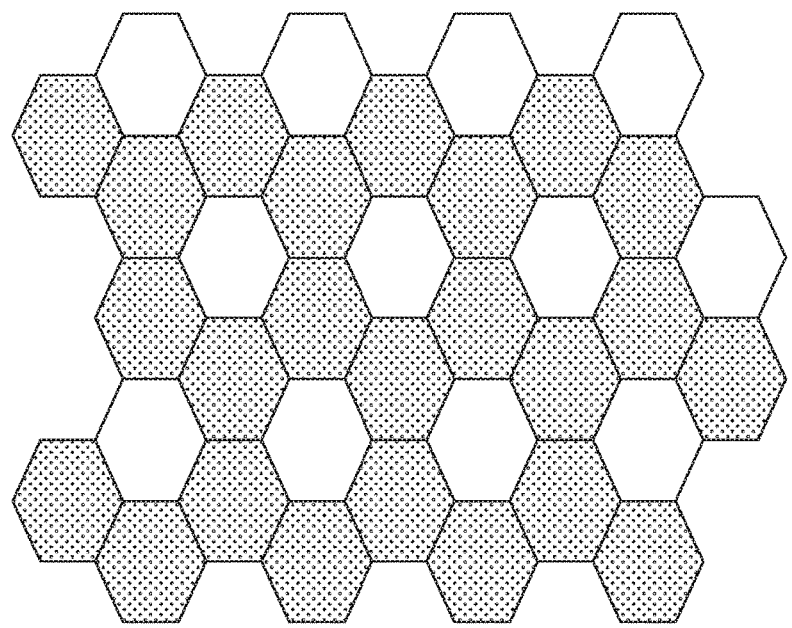
FIG. 4 is a diagram showing hexagonal regions of using a single frequency combined with time slot assignment embodying the invention.

FIG. 4 shows a time-frequency arrangement embodying the invention in which regions transmitting on the same frequency are shown shaded and those not transmitting at that instant are shown un-shaded. As before, the regions are shown as hexagonal cells, but other shapes are possible, including irregular shapes to account for geographic features. The embodiment thereby combines the use of the interference mitigation by de-mapping with that of 'aligned frequency re-use'. The latter exploits different use patterns over time, in effect creating temporal vectors for each region or cell describing its corresponding on/off state. The aim is to design these vectors over region or cell types in an advantageous way, to maximise capacity whilst avoiding or limiting interference.

Figure 5:
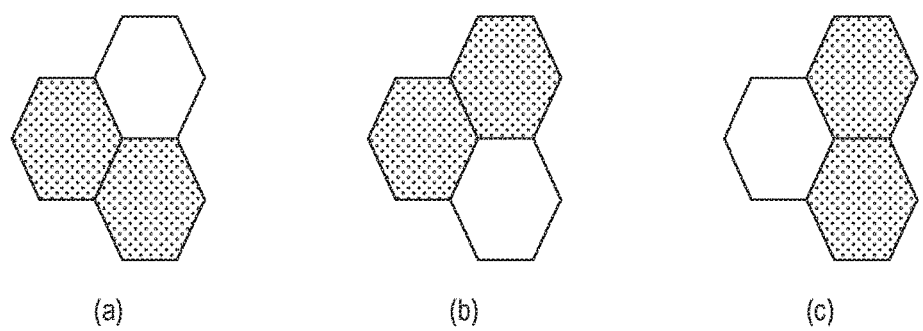
FIG. 5 is a diagram showing the three time slots used in the system of FIG. 4 for a group of three adjacent regions.

FIG. 5 shows the temporal procedure, noting that all transmitters are now on the same frequency, but are not all simultaneously present. The system is organised with three time slots. In slot 1 the system radiates signals as shown in FIG. 4. The white cells are not radiating. We note that ⅔ of the cells are illuminated, but we have eliminated all nodes where three transmissions come together. FIG. 5(a) shows a subset of 3 cells for this first time slot that forms the repeated pattern of FIG. 4. In the second slot the cells are as shown in FIG. 5(b) and in the third slot as in FIG. 5(c).

The choice of time slot period length may depend upon the nature of the system. In the example of OFDM, the time slot is chosen to be a multiple of the OFDM symbol period. For DVB-T2, the time slot period may be 250 ms to match the frame period. In general, the time slot may be chosen to be as long as possible for accuracy of timing, but as short as possible for minimum latency. The time slot length may be selected accordingly. In between "on" periods for each group of antennas, a guard interval may be provided. Such a guard interval may take account of differential path lengths between transmitters and receivers.

The corresponding illumination vectors may be written as $$\begin{bmatrix} 1 \\ 1 \\ 0 \end{bmatrix}$$

$$\begin{bmatrix} 0 \\ 1 \\ 1 \end{bmatrix}$$

and $$\begin{bmatrix} 1 \\ 0 \\ 1 \end{bmatrix}$$

In this way the system provides coverage for two out of three regions in each slot, i.e. two transmissions out of three, on a single frequency, resulting in a transmission rate of ⅔. This is equivalent to an n=1.5 network, outperforming the n=2 scheme previously noted as compatible with single-interferer mitigation.

In practice a PLP-type or FEF-type signal structure, as in DVB-T2, synchronised over transmitters, could be used to selectively switch on transmissions at the required times.

Figure 6:
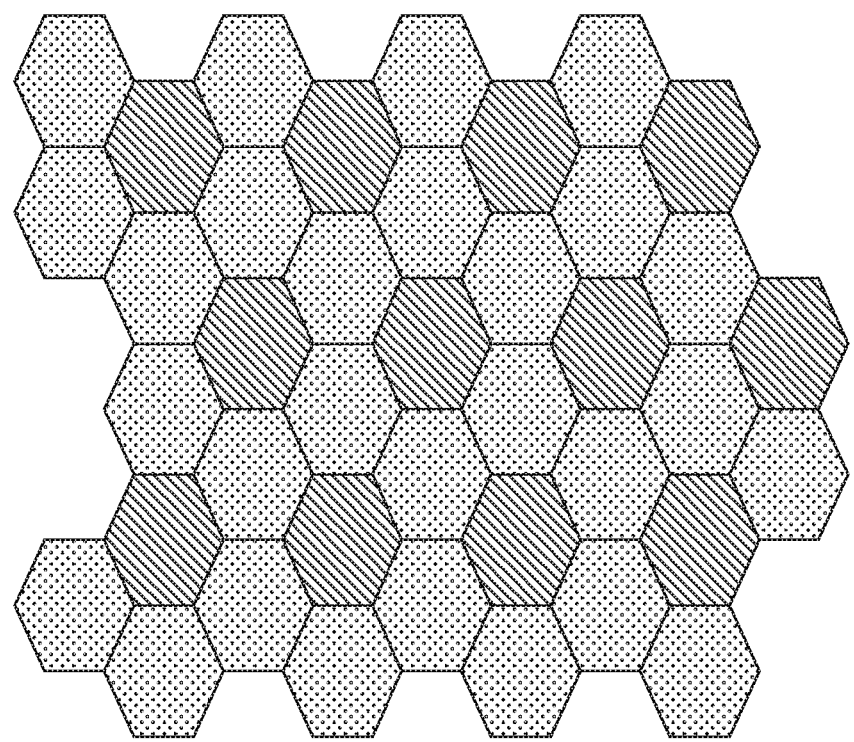
FIG. 6 is a diagram showing hexagonal regions using two frequencies which is compatible with single-interferer mitigation.

FIG. 6 shows an arrangement using a combination of different frequencies for some adjacent cells which may be combined with the de-mapping techniques described. If a receiver has the ability to reject one interferer on the same frequency (f1) as a desired signal, the regions may be arranged such that a receiver only receives two signals on the same frequency (f1) in one time slot. In this arrangement, 2 of the 3 regions in a sub-set of 3 regions broadcast in a given time slot on one frequency (f1). The other region may broadcast on a different, non-interfering, frequency (f2). If used in this way, this is an n=2 network since two frequencies are required. For those two frequencies, at any time, the arrangement achieves a total capacity of ⅔ for the first frequency (f1), plus ⅓ for the second (f2), or 0.5 on average across the two frequencies where in this context a capacity of 1 means 1 frequency being used in all cells, full-time.

With the arrangement of FIG. 6, we can make use of the same technique as in FIG. 4 and effectively combine two independent single frequency arrangements together. In such an arrangement, in each time slot 2 out of 3 regions in a sub-set broadcast on one frequency (f1), and a different 2 out of 3 regions in the sub-set broadcast on another frequency (f2). In effect, two cooperative networks are provided equivalent to using the first embodiment again on another frequency. Multiple such frequencies may be used, each using the de-mapping technique. In this example, each is equivalent to an n=1.5 network, as with the embodiment of FIG. 4. More generally, in arrangements in which a region is not transmitting in a given time slot, for a frequency, that region may of course broadcast on a different frequency.

Other region or cell shapes are possible. For example, antennas may be arranged in a rectilinear array providing square region shapes. In this arrangement, a receiver in the vicinity of a node of the cells will potentially receive 1 wanted signal and 3 interfering unwanted signals. If the receiver is capable of separating 3 signals by demapping, then the transmission scheme is chosen so that only 3 out of 4 adjacent antenna regions transmit in a given time slot. Further shapes are possible with the number of adjacent antennas simultaneously transmitting in a given time slot always being less than or equal to the number of signals that may be demapped by receivers.

The invention claimed is:

1. A method of operating a wireless network to broadcast signals from transmitters to receivers, the network comprising regions arranged adjacent to one another, the method comprising:
   transmitting signals in subsets of adjacent regions on a single frequency, the signals in at least some regions of a subset differing from one another, to receivers that are capable of receiving signals from multiple regions and of separating the multiple signals using a signal de-mapping arrangement;
   wherein the transmitting comprises transmitting in regions according to a pattern of time slots such that, in each time slot, the number of adjacent regions of a subset simultaneously transmitting on the single frequency is less than or equal to the number of signals each receiver is capable of de-mapping such that a wanted signal may be separated from unwanted signals,
   wherein the time slots are arranged such that a different one or more of regions of each subset does not transmit on the single frequency in consecutive time slots.

2. A method according to claim 1, wherein the de-mapping arrangement comprises processing signals using MIMO techniques.

3. A method according to claim 2, wherein the de-mapping arrangement uses a constellation scheme.

4. A method according to claim 1, wherein the de-mapping arrangement comprises QAM or a variant.

5. A method according to claim 1, wherein the regions are arranged in a repeated pattern comprising the subsets of regions.

6. A method according to claim 1, wherein the time slots are arranged such that each region of a subset transmits according to a sequence.

7. A method according to claim 6, wherein the sequence is arranged such that each region transmits on average over multiple time slots for the same amount of time as other regions in each subset.

8. A method according to claim 6, wherein the sequence comprises a rotating pattern from one region to the next.

9. A method according to claim 6, wherein each sub-set comprises three regions and in a given time slot two of the three regions transmit and one region does not transmit.

10. A method according to claim 6, wherein the sequence is pseudo-random.

11. A method according to claim 1, wherein the regions are notionally hexagonal and the number of adjacent regions of a subset simultaneously transmitting is two.

12. A method according to claim 1, wherein the de-mapping arrangement is operable to separate two signals.

13. A method according to claim 1, wherein the time slots are related in length to the signals.

14. A method according to claim 13, wherein the time slot length is an integer multiple of an OFDM symbol of the signals.

15. A method according to claim 13, wherein the time slot length is an integer multiple of a frame length of the signals.

16. A wireless network arranged to broadcast signals from transmitters to receivers, the network comprising regions arranged adjacent to one another, comprising:
- a modulator configured to transmit signals in subsets of adjacent regions on a single frequency, the signals in at least some regions of a subset differing from one another, to receivers that are capable of receiving signals from multiple regions and of separating the multiple signals using a signal de-mapping arrangement; and
- a transmitter configured to transmit in regions according to a pattern of time slots such that, in each time slot, a number of adjacent regions of a subset simultaneously transmitting on the single frequency is less than or equal to a number of signals each receiver is capable of de-mapping such that a wanted signal may be separated from unwanted signals, wherein the time slots are arranged such that a different one or more of regions of each subset does not transmit on the single frequency in consecutive time slots.

17. A wireless network according to claim 16, wherein the de-mapping arrangement comprises processing signals using MIMO techniques.

18. A wireless network according to claim 17, wherein the de-mapping arrangement uses a constellation scheme.

19. A wireless network according to claim 16, wherein the de-mapping arrangement comprises QAM or a variant.

20. A wireless network according to claim 16, wherein the regions are arranged in a repeated pattern comprising the subsets of regions.

21. A wireless network according to claim 16, wherein the time slots are arranged such that each region of a subset transmits according to a sequence.

22. A wireless network according to claim 21, wherein the sequence is arranged such that each region transmits on average over multiple time slots for a same amount of time as other regions in each sub-set.

23. A wireless network according to claim 21, wherein the sequence comprises a rotating pattern from one region to the next.

24. A wireless network according to claim 21, wherein each sub-set comprises three regions and in a given time slot two of the three regions transmit and one region does not transmit.

25. A wireless network according to claim 21, wherein the sequence is pseudo-random.

26. A wireless network according to claim 16, wherein the regions are notionally hexagonal and the number of adjacent regions of a subset simultaneously transmitting is two.

27. A wireless network according to claim 16, wherein the de-mapping arrangement is operable to separate two signals.

28. A wireless network according to claim 16, wherein the time slots are related in length to the signals.

29. A wireless network according to claim 28, wherein the time slot length is an integer multiple of an OFDM symbol of the signals.

30. A wireless network according to claim 28, wherein the time slot length is an integer multiple of a frame length of the signals.

31. A broadcast network comprising regions arranged adjacent to one another, the broadcast network comprising:
- a receiver configured to receive signals from adjacent regions of a subset of regions on a single frequency, the signals from at least some regions of a subset differing from one another,
- a demodulator configured to separate the multiple signals using a signal de-mapping arrangement by using knowledge of a transmission pattern of time slots in which, in each time slot, a number of adjacent regions of a subset simultaneously transmitting on the single frequency is less than or equal to the number of signals the receiver is capable of de-mapping such that a wanted signal may be separated from unwanted signals, wherein the time slots are arranged such that a different one or more of regions of each subset does not transmit on the single frequency in consecutive time slots.

* * * * *